United States Patent
Macek

[15] 3,649,931
[45] Mar. 14, 1972

[54] COMPENSATED FREQUENCY BIASING SYSTEM FOR RING LASER

[72] Inventor: Warren M. Macek, Huntington Station, N.Y.

[73] Assignee: Sperry Rand Corporation, Great Neck, N.Y.

[22] Filed: Nov. 3, 1969

[21] Appl. No.: 873,257

[52] U.S. Cl. ..........................331/94.5, 356/106 LR, 324/43, 224/96, 350/147, 350/151, 350/157, 350/160
[51] Int. Cl. ..........................................G02f 1/22, H01s 3/10
[58] Field of Search ...................331/94.5; 356/106 RL, 117; 324/43 L, 96; 350/147, 150, 151, 157, 160

[56] References Cited

UNITED STATES PATENTS

| | | | |
|---|---|---|---|
| 1,961,706 | 6/1934 | Pajes | 350/151 |
| 3,360,323 | 12/1967 | Weisman et al. | 350/151 |
| 3,392,622 | 7/1968 | Senf | 356/106 |
| 3,462,708 | 8/1969 | McClure | 331/94.5 |
| 3,480,878 | 11/1969 | Macek | 331/94.5 |
| 3,486,130 | 12/1969 | Macek | 331/94.5 |
| 3,508,831 | 4/1970 | Macek | 331/94.5 |

FOREIGN PATENTS OR APPLICATIONS

| | | | |
|---|---|---|---|
| 1,170,540 | 11/1969 | Great Britain | 324/96 |

*Primary Examiner*—Ronald L. Wibert
*Assistant Examiner*—R. J. Webster
*Attorney*—S. C. Yeaton

[57] ABSTRACT

A compensated Faraday bias cell system is adapted to shift differentially the respective phases of the contradirectionally flowing light waves propagating in a ring laser cavity. The desired phase shift is produced by Faraday effect interaction occurring between the light waves and symmetrically disposed dual segments of the compensating bias cell system, the segments being specially oriented so as substantially to compensate for or to eliminate undesired reactions in the cell to the presence of disturbing ambient magnetic fields. The compensating bias cell may be employed as a corner mirror in a ring laser device of the type used for measuring rotation rate.

10 Claims, 4 Drawing Figures

INVENTOR
WARREN M. MACEK

INVENTOR
WARREN M. MACEK
BY
*H. H. Terry*
ATTORNEY

COMPENSATED FREQUENCY BIASING SYSTEM FOR RING LASER

BACKGROUND OF THE INVENTION

1. Field of the Invention

The present invention relates to ring lasers and more particularly to means for differential phase shifting of the contradirectional light waves propagating in a ring laser, a phase shift needed for producing a discrete difference between the respective frequencies of the respective light waves and thereby precluding undesired mode locking effects.

2. Description of the Prior Art

A ring laser comprises an active lasing medium disposed relative to reflective or refractive optical-cavity forming components adapted to direct light waves emitted from the active medium in opposite directions around a closed planar path. Oscillatory modes occur at those particular frequencies for which the closed path length is an integral number of light wave lengths. Hence, the contradirectionally propagating light waves oscillate at the same frequency when their respective path lengths are equal, but at different frequencies when the path lengths are unequal. The latter event occurs, for example, when the cavity is rotated about an axis perpendicular to the propagation plane of the light waves. The rotational rate may be measured by extracting from the cavity a small portion of the energy in each light wave by partial transmission through or reflection from one of the cavity-forming components. Combining means external of the cavity directs the extracted light waves in collinear relation onto a photodetector which provides an electrical beat-frequency signal whose frequency corresponds to the difference between the light wave frequencies. The difference frequency is linearly related to the rotation rate of the ring for comparatively fast rotation but, as the rate decreases toward zero, the relationship becomes nonlinear because of coupling between each light wave within the ring of backscattered components of the oppositely propagating waves. As the rotation rate decreases even farther toward zero, but while still at some finite value, the coupling becomes sufficient to synchronize the contradirectional waves, resulting in an abrupt cessation of the beat-frequency signal. This frequency synchronizing phenomenon is referred to as mode locking and the corresponding beat frequency or rotational rate at which it occurs is called the mode locking threshold.

To avoid mode locking and the consequent inability of the ring laser to sense rotational rates in its presence, a nonreciprocal phase shift must be imparted to the waves either by rotating the ring in the aforesaid manner or by inserting in the propagation path some means such as an optically birefringent medium that exhibits discrete propagation constants to orthogonally polarized waves propagating through it. Thus, if the contradirectional waves are orthogonally polarized while traversing the birefringent material, their effective closed path lengths will be unequal. As a result, the waves oscillate at different frequencies and, if the difference frequency is sufficiently large, mode locking will not occur. Under these conditions, rotation of the ring laser will either increase or decrease the beat frequency, thereby providing an indication of both rate and sense of rotation.

Although prior art frequency biasing cells comprising birefringent devices used in conjunction with polarization converters or rotators have been successful in avoiding mode locking, they have also created other problems which detract from their utility in some circumstances. More specifically, use of such frequency bias cells increases the cost of the rotation sensor and makes it more difficult to align. In addition, transmission types of bias cells increase backscatter which, in turn, may increase the coupling between the contradirectionally flowing waves, causing the mode locking threshold to increase. This undesirably reduces the dynamic rotation rate sensing range as determined by the difference between the nominal beat frequency and the locking frequency.

Furthermore, prior art transmission types of Faraday bias cells are placed within the ring itself and play only the role of bias control. Location of the bias cell within the ring limits flexibility of design and injects troublesome and complex requirements as to temperature stabilization and shielding against the effects of any ambient magnetic fields that may be present. The conventional transmission type of Faraday bias cell is inherently a magnetic field sensitive device, and thus must be adequately shielded against stray magnetic fields. Such fields shift the bias point, thus undesirably disturbing the calibration of the rate of turn device. If significant magnetic field time or space gradients are present in the volume occupied by the ring, the output of the device is correspondingly disturbed. To avoid such disturbances, prior art systems require the use of bulky shielding, undesirably increasing the cost and weight of the instrument.

SUMMARY OF THE INVENTION

The present invention provides means for differentially phase shifting the contradirectionally flowing waves in a ring laser to produce a frequency bias without the necessity for either rotating the ring or inserting active components into the light propagation path itself. Operation of the inventive apparatus is based on the classical Faraday effect. It is well known that a material exhibiting the Faraday effect will in the presence of a magnetic field cause a nonreciprocal phase shift to occur between circularly polarized light waves where each is polarized in the opposite sense.

As in the conventional ring laser transmission Faraday cell geometry, the plane polarized light waves pass through a properly oriented quarter-wave plate and then into the Faraday The plane polarized light passing into the quarter-wave plate is converted into circularly polarized light. When it emerges from the Faraday material, it is converted back into a plane polarized wave through the operation of a second quarter-wave plate.

In the invention, two independent Faraday cell segments or units, each somewhat similar to the above-described unit, are employed. Each is excited by a separate magnetic field generating solenoid. The cell units are oriented so that the light beam paths through them are substantially parallel. The light path from the output of the first cell segment or unit to the input of the second is completed by a mirror or other reflective system. In the second cell unit, the light waves once again experience the operation of the Faraday effect; thus, the total useful phase shift is, for example, double that effected by one of the individual cell units.

On the other hand, at least the first order effect of any ambient magnetic field present is cancelled by virtue of the special side-by-side orientation of the two Faraday cell units. For example, any such disturbing field will add to the desired phase shift produced by the first cell unit, but will in the second identical cell unit simply subtract the same phase shift from the total desired phase shift. Thus, perturbing ambient magnetic fields have substantially no effect on the desired total Faraday phase shift experienced by light waves propagating in either sense through the bias device.

In addition to the important feature of the invention that the effects of perturbing magnetic fields are substantially cancelled, the invention is characterized by other important aspects. It is seen that the invention has the properties of the simple corner mirror of which several are commonly employed in ring laser devices. It may thus be employed as a substitute for one of the conventionally employed simple mirrors. Thus, the Faraday magneto-optic effect may be used to frequency bias a ring laser while at the same time providing a magnetically controlled cavity-forming corner mirror. This is accomplished by constructing a corner reflector or mirror including Faraday effect cells in which opposed magnetic fields are established preferably in a direction lying in the plane of the ring laser cavity.

DESCRIPTION OF THE PREFERRED EMBODIMENT

Figure 1:
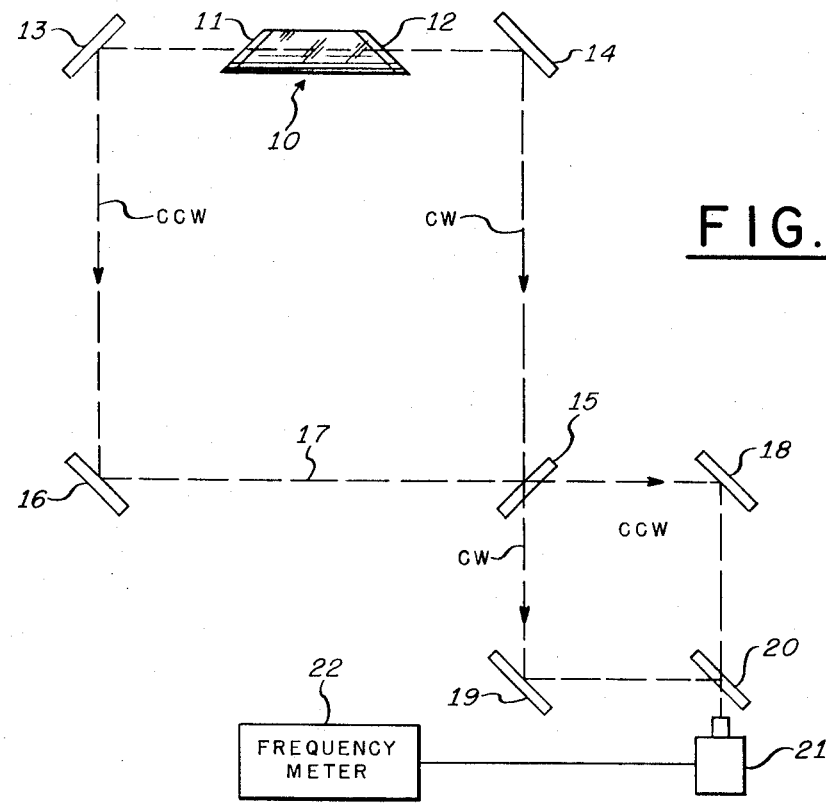
FIG. 1 is a schematic of a ring laser optical cavity incorporating the invention.

Referring to FIG. 1, an active lasing medium, such as the standard He-Ne gas mixture energized by conventional r.f. means (not shown), contained within glass tube 10 emits light waves in both directions along its longitudinal axis through optical flats 11 and 12 sealing the ends of the tube. Optical cavity-forming mirrors 13, 14, 15 and 16 successively reflect the contradirectionally flowing light waves around a closed path 17. The optical flats are inclined at Brewster's angle with respect to the longitudinal axis of tube 10 to provide light waves that are plane polarized parallel to the plane of the optical cavity, light so polarized being referred to hereinafter as horizontally polarized. Although other polarization orientations may be used, the light waves are preferably horizontally polarized in practicing the invention in order to minimize distortion; that is, to prevent the light from becoming elliptically polarized upon being reflected from the cavity-forming mirrors, as will be explained subsequently in greater detail.

A measure of the difference between the frequencies of the contradirectionally flowing waves resulting from non-reciprocal effects present in the optical cavity is obtained by transmitting part of the light energy in each beam through corner mirror 15 to a combiner mechanism comprising mirrors 18 and 19, beam splitter 20, and photodetector 21. The component of the clockwise light wave transmitted through corner mirror 15 is first reflected from combiner mirror 19 and then partially reflected from beam splitter 20 into the photodetector. Likewise, the portion of the counterclockwise wave extracted from the cavity is reflected from combiner mirror 18 and partially transmitted through the beam splitter 20 in collinear relation with the clockwise wave into photodetector 21, wherein the light waves mix to produce a beat frequency signal whose frequency is equal to the difference between the wave frequencies. The beat frequency signal may then be read on a commercially available frequency meter 22.

To overcome the mode locking effect which occurs at low rotational rates, a non-reciprocal phase shifting device is incorporated in the optical cavity by means of a magnetic field established, for example, in corner mirror system 16. The magnetization in the corner mirror system interacts with the incident contradirectionally flowing waves in such a manner that a differential phase shift is imparted to the waves in the process of being reflected from the mirror system. As a result, the contradirectional waves oscillate at different frequencies so that mode locking does not occur even when the optical cavity is stationary. The magnetization in the corner mirror system is preferably oriented parallel to the plane of the optical cavity. These conditions of polarization and magnetization provide the desired differential phase shift while simultaneously preserving the polarization of the light waves.

Figure 2:
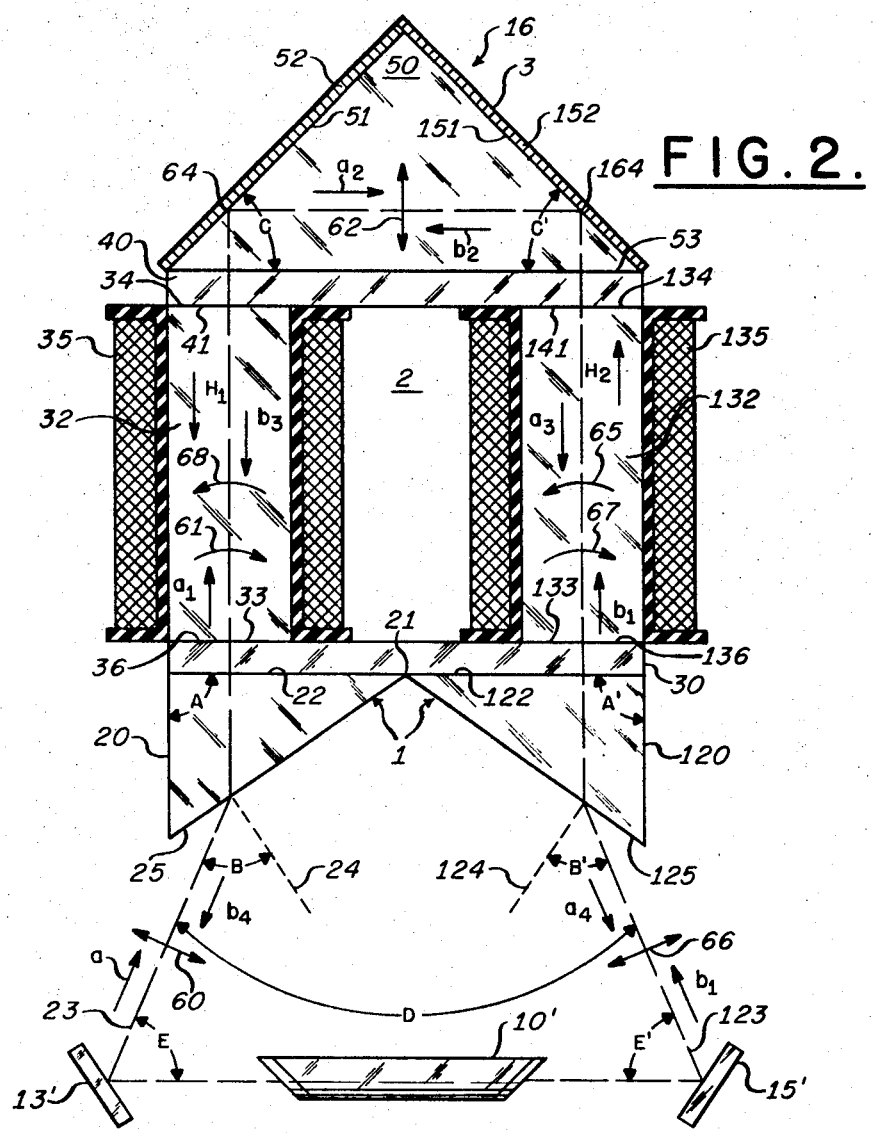
FIG. 2 is a plan view in partial cross section of a preferred embodiment of the invention.

It should be understood that the term "ring" as employed in the foregoing discussion and in what follows refers not to a circular ring, but to an N-sided figure, where the value of N is usually an integer such as three or four. For example, FIG. 1 has been drawn to illustrate the invention as operating in a four-sided or square ring. In FIG. 2, from which the structure and operation of the inventive composite mirror-optical phase shifter will be described, it will be explained that the composite mirror-phase shifter may be employed as previously suggested in the position of corner mirror 16 of FIG. 1 or that it may be used in a similar way in a laser ring having only three sides. The structure and operation of the composite mirror-optical phase shifter apparatus shown in FIG. 2 is the same in both instances, with the mere exception that the angles of entry and exit of the light waves into the composite mirror-phase shifter structure 16 will differ, as will be described in what follows.

Referring now to FIG. 2, there is illustrated a composite mirror-phase shifter device 16 for employment in place of the conventional type of simpler mirror that has been used in the past in ring lasers. The device 16 includes a light beam direction means 1 illustrated in FIG. 2 as consisting of symmetrically oriented prisms 20 and 120. The right angle prisms 20, 120 are placed so that they form a configuration with mirror image symmetry and, thus, so that they make contact along a single line 21 perpendicular to the plane of the drawing, the base sides 22 and 122 of the respective prisms being coplanar. Angles A and A' are 90°. The values chosen for the other angles of prisms 20 and 120 depend upon the angles between the respective exit and entry paths 23 and 123 of the light beams. In any event, the angle B between, for example, the ray path 23 and the perpendicular 24 to the entrance surface 25 of prism 20 is preferably selected to be equal to Brewster's angle so as to permit efficient transfer of the light waves along path 23 into prism 20. The similarly defined angle B' associated with the ray path 123 and prism 120 is similarly made equal to Brewster's angle.

Prisms 20 and 120 are cemented to an optical quarter-wave plate 30 whose function will hereinafter be described. Prisms 20 and 120 are cemented along one surface of the quarter-wave plate 30 by employing a layer of conventional optical cement 31 of the type often used in the art for bonding optical components to each other. The cement layer 31 may constitute any of several lens bonding cements available on the market; for example, a cement of the epoxy type is useful. Generally, the cement employed has an index of refraction intermediate that of the material of prisms 20 and 120 and the material of quarter-wave plate 30.

Built upon the quarter-wave plate 30 and including it is the optical phase shifting device 2 including elements 32 and 132. Phase shifter element 32, for example, comprises a rod or cylinder 32 of a material having a suitable Faraday coefficient and otherwise being mechanically and physically suitable for the application. The rod 32 is polished at its end 33 and is optically cemented at juncture 36 to the upper surface of quarter-wave plate 30.

Any of a variety of known materials, including certain glasses, may be employed in fabricating rod 32, such as certain glass materials known, for example, as extra light flint glass. Other glass materials, such as barium light flint, may be employed. Rod 32 has an end 34 opposite end 33 which is also ground to be optically flat and, furthermore, is parallel to end 33. Rod 32 is encompassed by a solenoid 35 wound with a sufficient number of turns of conducting wire such that a magnetic field on the order of 100 Gauss may be generated within the Faraday phase shifter rod 32.

Continuing a construction having mirror image symmetry, a second Faraday phase shift rod 132 with an optically flat end 133 is cemented at the juncture 136 to quarter-wave plate 30. Like phase shifter rod 32, rod 132 has a second end 134 opposite its first end 133 which is ground optically flat and parallel to end 133, and rod 132 is furthermore provided with an encompassing solenoid 135 having capabilities similar to solenoid 35.

The dual phase shifter section 2 of the composite mirror-phase shifter device 16 is completed by the use of a second quarter-wave plate 40. Quarter-wave plate 40 is placed on top of the respective ends 34 and 134 of Faraday phase shifter rods 32 and 132. Quarter-wave plate 40 is furthermore cemented to the respective ends 34 and 134 of phase shifter rods 32 and 132. Again, the cement employed between surfaces 34 and 134 and the optically flat surface of the second quarter-wave plate 40 is applied in such a manner that the junctures 41 and 141 have an index of a refraction intermediate those of the Faraday rods 32 and 132 and the index of a refraction of quarter-wave plate 40.

Quarter-wave plates 30 and 40 are manufactured with optically ground and parallel upper and lower surfaces and may be made of any of several suitable materials in any of several suitable ways as characterized by any of a variety of conventional quarter wave devices available on the market. Generally, the most useful material is crystalline quartz and it is preferable to use the conventional zero-order type of quarter-wave plate construction. Thus, quarter-wave plates 30 and 40 are of thicknesses suitable for handling and for bonding to rods 32 and 132 in such a manner that the composite structure 16 is reasonably easy to fabricate and has acceptable structural properties.

The composite mirror-phase shifter system 16 is completed by an element 3 which may employ refractive and/or reflective elements. As noted previously, its function is to return light waves emanating from the dual phase shifting means 2 back into said means 3. The means 3 comprises a simple equilateral prism 50 having reflective sides 51 and 151 which may be coated, for example, with a thin layer of gold or other optically reflecting material, such as at 52 and 152. The angles C and C' of the prism may be arranged so that the light waves strike the surface 51 in such a manner that total internal reflection is obtained. Prism 50 may be constituted of a suitable flint glass or other material of which such equilateral roof reflector prisms are conventionally made. Furthermore, it is bonded at juncture 53 by a suitable optical bonding cement to the upper surface of quarter-wave plate 40, that upper surface and the surface 53 of prism 50 to be bonded having been ground so as to be optically flat.

In operation, it is observed that light waves enter and leave the composite mirror-phase shifter structure 16 both along light paths 23 and 123. In the instance of a four-sided ring laser, the angle D between paths 23 and 123 will generally be 90°. Should a three-sided ring be employed, as is suggested in FIG. 2, the angle E associated with mirror 13' and the angle E' associated with mirror 15' may both be made equal, for example, to 67°. In this instance, the angle D will be 48°. In any event, for any selected value of angle D, the angle B characterizing path 23 relative to the surface 25 of prism 20 will preferably be the Brewster's angle.

Consider now an optical wave 23 travelling into the surface 25 as indicated by the arrow a. As aforementioned, wave 23 is horizontally polarized, i.e., polarized in the plane of the drawing as indicated by the double headed arrow 60. Wave a strikes surface 25 and is refracted into prism 20, retaining its horizontal polarization characteristic. In traversing quarter-wave plate 30, its linearly polarized characteristic is converted into circular polarization, whereupon it flows into the Faraday rod 32.

Within rod 32, the wave's direction of propagation is indicated by the arrow $a_1$ and its sense of polarization is indicated in the conventional manner for indicating a circularly polarized light wave by the arcuate arrow 61. Within rod 32, the light wave suffers a phase shift in proportion to the magnetic field $H_1$ generated by solenoid 35.

Upon leaving rod 32 at surface 34, the light wave passes through quarter-wave plate 40 which, as is well known, has the property of converting the circular polarization 61 back into the horizontally polarized state. Passing into reflector prism 50, the wave under discussion is propagated as illustrated by the arrow $a_2$ and remains horizontally polarized as indicated by the double headed arrow 62 after reflection at point 64 from reflecting surface 51. The wave $a_2$ travels horizontally through prism 50, then again experiences total reflection at point 164 on reflecting surface 151 of prism 50. The wave reflected at point 164 passes perpendicularly through quarter-wave plate 40 where it again experiences conversion from a linearly polarized state to a circularly polarized state such as indicated by the arcuate arrow 65 adjacent arrow $a_3$, which latter defines the direction of flow of the wave under discussion in the Faraday rod 132. Within rod 132, the wave $a_3$ experiences a phase shift in proportion to the magnitude of magnetic field $H_2$.

In one mode of operation of the apparatus, the magnetic fields $H_1$ and $H_2$ are chosen to be equal, but are directed in opposite senses. However, these fields appear in this mode to be in the same sense as far as the light wave a is concerned as it traverses through them. The phase shift undergone by wave a is therefore equal in both rods and in total is equal to twice the phase shift in the rod 32, for example. Such a result is further enhanced by making the rods 32 and 132 and the associated optical parts of the invention have mirror image symmetry.

Wave $a_3$ now passes out of rod 132 and again flows through quarter-wave plate 30, wherein it experiences conversion into a plane polarized wave. That wave traverses prism 120, wherein it is refracted at surface 125 as described previously. Thus, the emergent wave $a_4$ is shown as being linearly polarized in the plane of the drawing by the double headed arrow 66. Wave $a_4$ is reflected by corner mirror 15' into laser 10' and flows out of laser 10' in an amplified state to be reflected by corner mirror 13' from which it originated.

The operation of the system is similar for the counter-clockwise wave $b_1$ reflected by corner mirror 15' to be refracted into prism 120 at surface 125. Note that wave $b_1$ traverses the same path 23, 123 as was traversed by wave $a_4$ and is horizontally polarized as is indicated by the double headed arrow 66. Upon entry into quarter-wave plate 30, the wave becomes circularly polarized. Its state is indicated by the arcuate arrow 67 adjacent the arrow $b_1$, the latter indicating wave $b_1$'s direction of flow in rod 132. Observe that it is now flowing in the direction of field $H_2$.

Upon emergence from rod 132, wave $b_1$ undergoes conversion to linearly polarized energy. After reflection at point 164, its direction of flow is indicated by the arrow $b_2$ and its sense of polarization again by the double headed arrow 62. Now, the wave $b_2$ is reflected at point 64; again following the same path as was followed by the previously described ray, it reenters quarter-wave plate 40. Here, it is converted again into circularly polarized energy as indicated by the arcuate arrow 68, its sense of flow being shown by the arrow $b_3$. Note again that the direction of flow is the same as the direction of magnetic field $H_1$ in rod 32.

Wave $b_3$ experiences a phase shift in rod 32 in proportion to the magnitude of field $H_1$, whereupon it emerges into quarter-wave plate 30, again being converted into horizontally polarized energy. After refraction at surface 25 of prism 20, the wave is represented as to the direction of its propagation by the arrow $b_4$ and as to character of linear polarization again by the double headed arrow 60. The wave $b_4$ continues to travel along path 23 and is reflected by corner mirror 13' through laser 10' which projects it after amplification onto mirror 15' from which it originally started.

It is a feature of the invention that the respective solenoids 35 and 135 associated with rods 32 and 132 are wound in such a manner that the magnetic fields $H_1$, $H_2$ cause the wave a to be shifted in phase by two equal increments in one sense. On the other hand, the fields $H_1$ and $H_2$ are seen to cause the wave $b_1$ to be shifted by the same two increments of phase shift, but in the opposite sense. Thus, the difference between the phases of waves a and b is equal to four times the phase shift produced, for instance, by rod 32 when wave a flows through it alone.

On the other hand, a feature of the invention is that any ambient magnetic field, fixed or variable, which has a component in the direction of the arrow labeled $H_a$ produces equal phases shifts in rods 32 and 132. However, the light waves a and b see these phase shifts as being in opposite senses, so that after the complete excursion through the composite mirror phase device 16, neither of the waves a, b are phase shifted because of the presence of said ambient field $H_a$. Thus, the composite corner mirror phase shifter device is compensated for the undesired effects that are caused in a conventional single cell transmission type of Faraday phase shifter device by the presence of ambient magnetic fields.

Furthermore, this novel result is achieved in a structure which has mirror image optical symmetry. It has long been an established principle of good optical design that refractive, reflective, and other optical elements which have such symmetry are superior in that the presence of such a characteristic makes easier to use in an optical system, problems with optical alignment being diminished. Furthermore, the magnetic field path tends to be a closed one and also has symmetry and is therefore more efficient. The arrangement forms a compact reflector-phase shifter device which may be placed at a corner of a ring laser. It is therefore not placed directly within the ring and it may be placed in relation to the ring mounting structure in such a way that it is relatively easily replaced and in such a manner that thermal problems are reduced. Placement of the device in a corner of the ring permits improved thermal stability of the ring.

Figure 3:
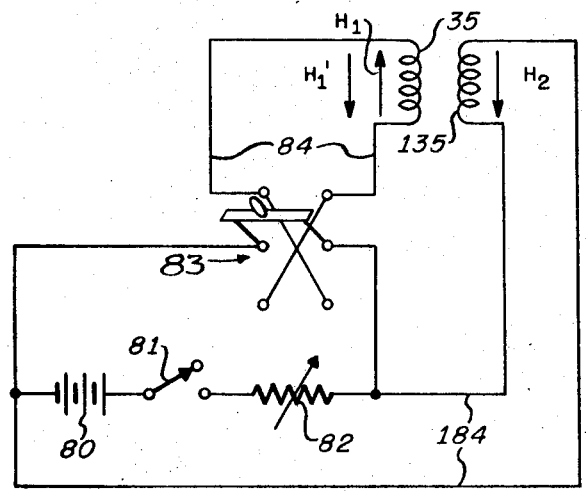
FIG. 3 is a schematic diagram of a circuit for exciting magnetic fields used in the invention.

A further feature of the inventive concept may be made apparent from FIG. 3. Here, solenoid 35 is shown as supplied by a unidirectional current via leads 84 from battery 80 regulated by rheostat 82 when switch 81 is closed. Similarly, an equal current flows via leads 184 to solenoid 135 when switch 81 is closed. With reversing switch 83 closed in one sense, the respective fields caused by solenoids 35 and 135 are in the respective senses of arrows $H_1$ and $H_2$; i.e., the fields $H_1$ and $H_2$ cause differential phase shift of the counterrotating light beams and produce a desired frequency bias effect.

Should it be desired to operate the ring laser in a second mode without frequency bias, but to be able to return instantaneously to the first or frequency biased mode of operation, switch 83 is simply reversed, so that solenoid 35 generates the field $H_1'$. Now, no differential phase shift is produced, since there is no net effect of fields $H_1'$ and $H_2$. However, any ambient field $H_2$ also cancels out, as before. In either mode, heat losses are the same in solenoids 35 and 135 and there is no net adverse effect caused by thermal drift and no consequent undesired transient or other effect on the calibration of the instrument.

Figure 4:
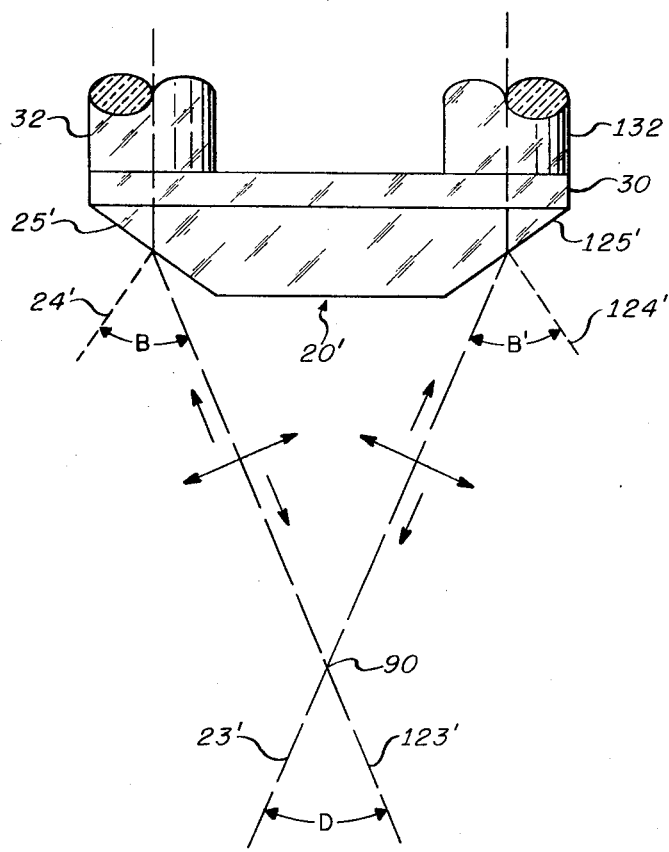
FIG. 4 is a fragmentary schematic plan view of an alternative form of a part of FIG. 2.

FIG. 4 illustrates another versatile feature of the invention. Here a prism 20' having modified light wave entrance and exit faces 25' and 125' is illustrated. The light wave paths 23', 123', respectively similar to paths 23, 123 of FIG. 2, cross at point 90 at an angle D, as before. The wave following path 123', for example, is refracted at face 25' into prism 20' and then passes through quarter-wave plate 30 and along the electrically active direction of Faraday rod 32. Similarly, a wave following path 23' is refracted at face 125' into prism 20' and then passes through quarter-wave plate 30 and along the electrically active direction of Faraday rod 132. The reverse flowing waves follow the same paths, producing counterrotating circulating waves when applied in a laser ring.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Phase shifter apparatus for providing non-reciprocal differential phase shift in counter-flowing light beams passing therethrough comprising:
    first and second magnetic-field-controllable optical phase shifter means,
    said optical phase shifter means including non-reciprocal first and second means for shifting the phase of first and second circularly polarized light beams passing therethrough along respective first and second light beam transmission paths, each said means for shifting the phase of circularly polarized light beams having substantially parallel first and second ends,
    said first ends being bonded to a first face of first quarter-wave plate means for reciprocal conversion of light between linearly and circularly polarized states,
    said second ends being bonded to a first face of second quarter-wave plate means for reciprocal conversion of light between linearly and circularly polarized states,
    means for orienting said first and second light beam transmission paths substantially perpendicular to said respective first ends,
    light beam directing means for providing a third light path joining said first and second light paths for the purpose of providing a continuous light path, AND
    first and second magnetic field generator means respectively coupled to said first and second magnetic-field-controllable optical phase shifting means for providing equal oppositely directed magnetic fields and said respective first and second light beam transmission paths and for the purpose of producing differential phase shift in said light beams traveling along said light paths in opposite directions while cancelling any phase shift effect thereon caused by the presence of an ambient magnetic field.

2. Apparatus as described in claim 1 wherein said means for orienting said first and second light beam transmission paths substantially perpendicular to said respective first ends comprises a refractive prism bonded to a second face of said first means for reciprocal conversion of light between linearly and circularly polarized states.

3. Apparatus as described in claim 1 wherein said light beam directing means for providing a third light path joining said first and said second light paths for the purpose of providing a continuous light path comprises a reflecting prism bonded to a second face of said second means for reciprocal conversion of light between linearly and circularly polarized states.

4. Phase shifter apparatus for providing non-reciprocal differential phase shift in counter-flowing light beams passing therethrough comprising:
    first and second magnetic-field-controllable non-reciprocal optical phase shifting means aligned in substantially parallel relation for providing substantially geometrically parallel first and second light paths,
    light beam directing means for providing a third light path joining said first and second light paths for the purpose of forming a continuous light path, and
    first and second magnetic field generator means respectively coupled to said first and second magnetic-field-controllable optical phase shifting means for providing substantially equal oppositely directed magnetic fields along said respective first and second light paths for the purpose of producing differential phase shift in said light beams traveling along said light paths in opposite directions while cancelling any phase shift effect thereon caused by the presence of an ambient magnetic field.

5. Apparatus as in claim 4, wherein said first and second field controllable optical phase shifting means each include:
    first and second means for reciprocal conversion of light between linearly and circularly polarized states,
    at least one means for shifting the phase of circularly polarized light,
    said first means for reciprocal polarization conversion being bonded at a portion of one of its faces to one end of said means for shifting the phase of circularly polarized light, and
    said second means for reciprocal polarization conversion being bonded at a portion of one of its faces to a second end of said means for shifting the phase of circularly polarized light.

6. The apparatus of claim 4 in combination with:
    additional means external of said differential optical phase shifter apparatus for amplifying light waves propagating in opposite directions through said optical phase shifter apparatus.

7. The apparatus of claim 6, wherein:
    said additional means comprises:
        at least a pair of light redirecting components adapted to form components of a laser optical cavity,
        an active lasing medium positioned in said optical cavity.

8. Apparatus as in claim 7, wherein:
said light waves propagating in opposite directions through said optical phase shifter apparatus propagates therein along paths lying substantially in a plane, and
said light waves when propagating elsewhere in said optical cavity is linearly polarized in said plane.

9. Apparatus as described in claim 4 and further including:
electrical current source means,
first and second solenoid means respectively encompassing at least parts of said respective magnetic-field-controllable optical phase shifter means, and
reversible switch means having a normal and a second state, said switch means being coupled to said solenoid means and to said current source means for selectively reversing current flow in at least one of said solenoid means when in said second state.

10. Apparatus as described in claim 4 and further including brewster angle prism means bonded to a second face of said first means for reciprocal conversion of light between linearly and circularly polarized states.

* * * * *